G. F. JOHNSON.
VARIABLE ELECTROSTATIC CONDENSER.
APPLICATION FILED MAY 18, 1920.
1,420,485.
Patented June 20, 1922.
Fig. 1.
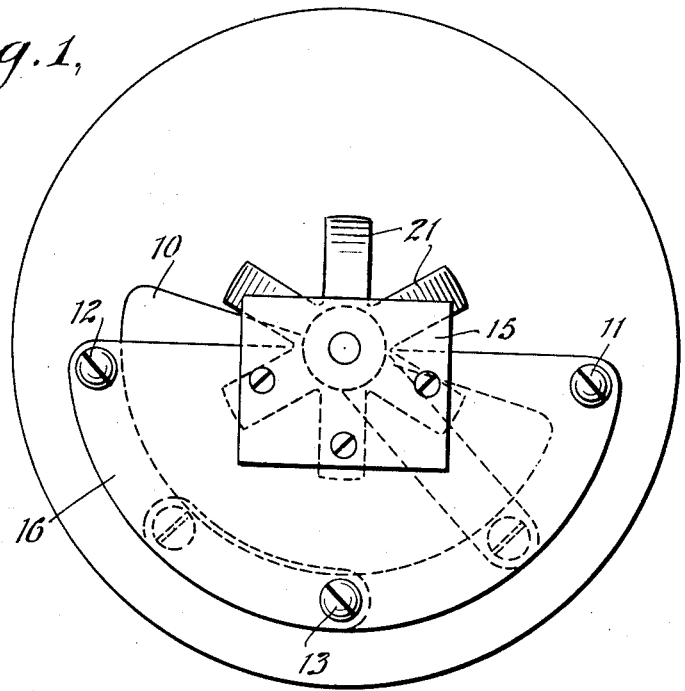
Fig. 2.
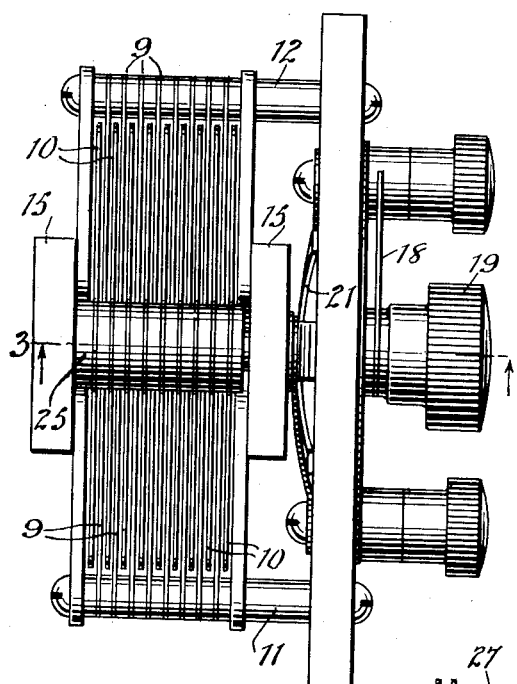
Fig. 3.
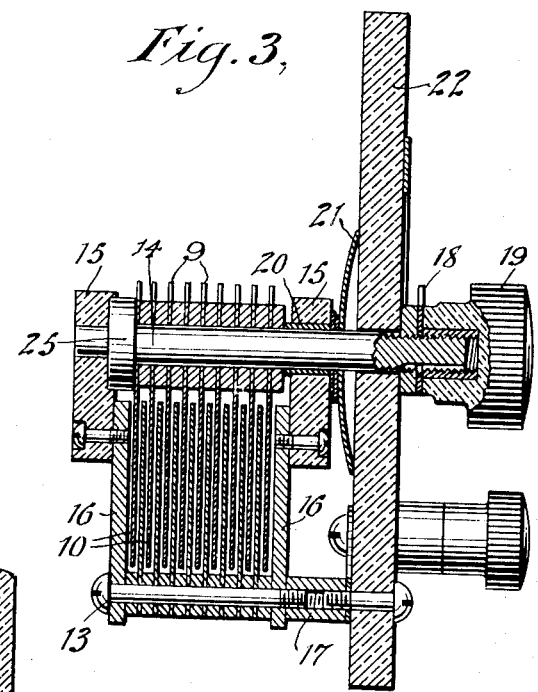
Fig. 4.
WITNESSES
Edw. Thorpe
S. W. Foster
INVENTOR
G. F. Johnson
BY
Munn & Co.
ATTORNEYS

UNITED STATES PATENT OFFICE.

GEORGE F. JOHNSON, OF SPRINGFIELD, ILLINOIS.

VARIABLE ELECTROSTATIC CONDENSER.

1,420,485.  Specification of Letters Patent.  Patented June 20, 1922.

Application filed May 18, 1920. Serial No. 382,440.

*To all whom it may concern:*

Be it known that I, GEORGE F. JOHNSON, a citizen of the United States, and a resident of Springfield, in the county of Sangamon and State of Illinois, have invented a new and Improved Variable Electrostatic Condenser, of which the following is a full, clear, and exact description.

This invention relates to improvements in adjustable electro-static condensers, an object of the invention being to provide improved means for maintaining the movable or rotor member of the condenser against accidental movement after adjustment.

A further object is to provide a condenser with a star or other shaped spring exerting frictional or elastic contact to hold the plates of the movable member or rotor of the condenser accurately and permanently centered with reference to the plates of the stationary member.

It is a matter of common knowledge that the storage capacity of an electro-static condenser is due, among other things, to the quality of the di-electric, that is the specific character of the di-electric, to the extent of the space separating the adjacent plates, so that it will have a greater storage capacity the closer the plates are together; and by varying the space separating the two armatures at any point, the storage capacity is increased and decreased, and the variation in capacity in a condenser in use in a wireless telegraph circuit renders the condenser unreliable in establishing and maintaining a reliable adjustment. The capacity of a condenser depends on the exposed area of the two plates or armatures with respect to each other; by decreasing the exposed area, the storage capacity is decreased. It follows from this that if you vary the exposed area of one plate or armature with respect to the other plate or armature, or if you vary the distance between the two adjacent armatures, you change the capacity and, therefore, the adjustment. It is convenient to join two series of thin metal plates and to interleave one series of plates with respect to the other. It is common to do this by fixing one series of plates in stationary position and pivoting another series of plates, so that one series of semicircular plates interleave with another series of semicircular plates; each arrangement, one fixed and the other movable, is called an armature. The movable set is on an arbor adapted to be rotated by a handle or button on the exposed exterior. It is possible to adjust the storage capacity of a condenser by varying the extent of exposure of the surface of one armature with respect to that of the other, and it is very important to cause the movable armature to move so true and accurate that one plate never makes contact with the other and, in moving to expose more or less surface, to move without making contact or irregular variations of distance between the adjacent surfaces of the two separate armatures.

In my improved condenser, one armature or stator is firmly fixed in position and the other armature or rotor is moved so true and accurate that there is no variation in parallelism between the interleaved plates. The movable armature is composed of a series of parallel thin metal plates separated a uniform distance and supported on a rotating arbor. The complementary armature is composed of a fixed series of rigidly supported plates separated a uniform distance and maintained in absolute parallelism so that the movable plates do not vary as to the extent of separation from the fixed plates but only vary as to the extent of surface exposure.

The accompanying drawings illustrate the invention.

Figure 1 is a top plan view of the condenser with the baseboard removed;

Figure 2 is a transverse section; and

Figure 3 is a section on the line 3—3, Figure 2, in the direction of the arrow.

Figure 4 is a fragmentary view in section illustrating a modification.

Referring to Figures 2 and 3, the two armatures 9 and 10 of the condenser are made of thin sheet aluminum. The armature 9 is semicircular, that is it is formed of thin plates of aluminum semicircular in area, and supported on posts 11, 12 and 13. The armature 10 is composed of a series of parallel plates of aluminum fixed on a central arbor 14, Figure 3. The arbor 14 is supported in bearings 15 on brackets 16 extending from a post 17. The arbor 14 carries an indicator needle 18 and a knurled thumb nut 19 by which the arbor 14 is rotated. To prevent inaccuracy of movement of the arbor 14, I fix a slip bushing 20 on the arbor 14, and this is engaged by a flat spring 21 having a plurality of contacts with the surface of the board 22; and the slip bushing 20 engages with the broad surface of the spring 21, from which it results that the spring 21 maintains the arbor 14 in an unchanged position during the manipulation of the thumb button 19. In other words, the arbor or spindle maintains its normal vertical position during the manipulation of the button 19 and does not wabble; the idea being to maintain absolute parallelism and uniform distance between the interleaved plates of the two series.

It is to be noticed that where panel mounting is employed, the central spindle or central arbor 14 takes a horizontal position. This is shown in Figures 2 and 3. On bench mounting, as known to the trade, the spindle is vertical. The spring 21 is generally a star spring. It will be noticed in Figure 3 that the star spring 21 acts through the slip bushing 20. The central arbor 14 turns in this bushing. This star spring 21, as shown in Figure 1, has six contact points. The manner of operation of the star spring is against the shoulder of the lower bearing of the central arbor, which is purposely made rather broad. The spring action being constant obviates the necessity of ever adjusting the bearings. There is another function of this same spring; that is, it keeps the plates of the rotor and the stator parts properly centered with each other, the instrument being made so that the centering is accurate when the pressure is in the direction of the spring's action.

It will be noticed that the star spring acts primarily through the slip bushing in the upper bearing, the central arbor turning in this bushing. The use of this bushing 20, however, is not absolutely essential to the proper functioning of the star spring 21, although it is preferred.

While I have illustrated a star-shaped spring as the preferred form of my invention, it is obvious that other shapes of springs could be employed without departing from my invention.

In the modification illustrated in Figure 4, the arbor 26, corresponding with the arbor 14 of the preferred form, is made with a shoulder 27 against which a perforated bow spring 28 bears to provide the necessary frictional engagement and prevent accidental displacement of the parts when once adjusted.

The star spring exerts its pressure against the lower bearing 25 of the arbor 14 which carries the movable armature, the weight of which armature is unbalanced when it is supported as shown in Figure 3, and this spring 21 creates a friction on the bearing 25, which tends to hold the movable armature centered and also hold it against independent movement arising from its unbalanced position on the horizontal arbor 14.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

What I claim and desire to secure by Letters Patent is:

1. In an electrostatic condenser, the combination with a support, and a set of spaced stationary metal plates on the support, of an arbor mounted in the support and having a shoulder thereon, a series of spaced disks on the arbor, a slip bushing around the arbor in one of its bearings, and a pressure device engaging the bushing and pressing the series of spaced disks against the shoulder to maintain the disks of the arbor in parallelism with and in spaced relation to the stationary plates.

2. In an electrostatic condenser, the combination with a support, and a set of spaced stationary metal plates on the support, of an arbor mounted in the support and having a shoulder thereon, a series of spaced disks on the arbor, a slip bushing around the arbor in one of its bearings, and a spring on the arbor interposed between the arbor and a fixed part of the support and exerting a continuous pressure on the series of spaced disks.

GEORGE F. JOHNSON.